United States Patent [19]

Narita et al.

[11] Patent Number: 4,613,657

[45] Date of Patent: Sep. 23, 1986

[54] METHOD FOR ANIONIC HOMOPOLYMERIZATION OF α-TRIFLUOROMETHYLACRYLATE

[75] Inventors: Tadashi Narita, Yokohama; Tokio Hagiwara, Tokyo; Hiroshi Hamana, Fukaya, all of Japan

[73] Assignee: Central Glass Company, Limited, Ube, Japan

[21] Appl. No.: 826,585

[22] Filed: Feb. 6, 1986

[30] Foreign Application Priority Data

Feb. 20, 1985 [JP] Japan .................................. 60-30623

[51] Int. Cl.[4] .......................... C08F 4/08; C08F 14/18
[52] U.S. Cl. .................................... 526/204; 526/209; 526/212; 526/245
[58] Field of Search ................ 526/212, 245, 209, 204

[56] References Cited

U.S. PATENT DOCUMENTS

| | | | |
|---|---|---|---|
| 2,472,811 | 6/1949 | Dickey | 526/245 |
| 3,285,894 | 11/1966 | Lim et al. | 526/212 |
| 3,386,977 | 6/1968 | Kleiner | 526/245 |
| 3,422,081 | 1/1969 | Wexler | 526/212 |
| 3,457,247 | 7/1969 | Katsushima et al. | 526/245 |

OTHER PUBLICATIONS

C. U. Pittman, Jr. et al., Macromolecules 13, pp. 1031–1036 (1980).
H. Ito et al, Macromolecules, 15, pp. 915–920 (1982).
H. Ito et al., Macromolecules 17, pp. 2204–2205 (1984).

*Primary Examiner*—Harry Wong, Jr.
*Attorney, Agent, or Firm*—Fleit, Jacobson, Cohn & Price

[57] ABSTRACT

A methanol-insoluble homopolymer of an α-trifluoromethylacrylate, which has either an alkyl group or a fluorine-containing alkyl group in the ester radical, is formed at good yields in an organic aprotic solvent by using an alkali metal alkoxide, e.g. lithium t-butoxide, as anionic polymerization catalyst.

10 Claims, No Drawings

METHOD FOR ANIONIC HOMOPOLYMERIZATION OF α-TRIFLUOROMETHYLACRYLATE

BACKGROUND OF THE INVENTION

This invention relates to a method of anionically homopolymerizing an α-trifluoromethylacrylate to obtain a methanol-insoluble polymer.

Fluorine-containing acrylic or methacrylic esters provide industrially important functional polymers. In view of some properties unique to fluorine-containing polymers, such as excellent resistance to chemicals, water- and oil-repelling property and suitably low indices of refraction, extensive studies have been conducted on the uses of fluorine-containing acrylic or methacrylic polymers as or in, for example, paint materials, textile oil, plastic optical materials for optical fibers and other elements of optical circuits, contact lenses, dental materials and resist materials. Some items have already been developed to the stage of practical applications. Polymers of this category are acquiring greater importance as the needs for new functional materials are increasing in various fields of advanced technology.

At an earlier stage of the development, the aforementioned polymers were mostly of fluorine-containing acrylic or methacrylic esters represented by the general formula (A):

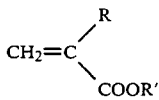
(A)

wherein R is hydrogen atom or methyl group and R' is a fluorinated alkyl group. That is, fluorine atoms were introduced exclusively into the ester radical part of the monomer.

Recently, much studies have been made on polymerization of another group of fluorine-containing acrylic or methacrylic esters in which at least one fluorine atom is present in the α-position. For example, methyl α-fluoroacrylate can be homopolymerized at good yields by using a radical polymerization initiator, and can also be copolymerized with methyl methacrylate. (C. U. Pittman Jr. et al., Macromolecules, 13, 1031(1980)). Contrastively it is also known that methyl α-trifluoromethylacrylate cannot be homopolymerized by using an ordinary radical polymerization initiator though this compound can be homopolymerized by anionic polymerization using either n-butyllithium or pyridine as Catalyst. (H. Ito et al., Macromolecules, 15, 915(1982)). Some possibilites of radical copolymerization of the same compound with, e.g., methyl methacrylate are also reported. (H. Ito et al., Macromolecules, 17, 2204(1984)).

Thus, α-trifluoromethylacrylates are somewhat different in polymerizability from other fluorine-containing acrylic and methacrylic esters. Particularly, homopolymerization of an α-trifluoromethylacrylate can be accomplished only by anionic polymerization, and the yield of the homopolymer is very low when a popular anionic polymerization catalyst such as n-butyllithium or Grignard reagent is used. Although the yield of the polymer is improved to some extent by using pyridine as the catalyst, the obtained polymer consists of a methanol-soluble fraction and a methanol-insuluble fraction. That is, there is no industrially practicable method for anionic homopolymerization of α-trifluoromethylacrylates.

SUMMARY OF THE INVENTION

It is an object of the present invention to provide a method of preparing a homopolymer of an α-trifluoromethylacrylate, by which method an entirely methanol-insoluble polymer can be obtained with good yields.

We have succeeded in accomplishing the above object by discovering that many kinds of alkali metal alkoxides are highly effective as anionic polymerization catalyst for homopolymerization of α-trifluoromethylacrylates.

More definitely, this invention provides a method of preparing a homopolymer of an α-trifluoromethylacrylate represented by the general formula (1), the method comprising the step of keeping the monomer of the α-trifluoromethylacrylate dissolved in an organic solvent in the presence of an anionic polymerization catalyst which is an alkoxide represented by the general formula (2):

(1)

wherein R represents an alkyl group or a fluorine-containing alkyl group:

(2)

wherein R' represents an alkyl group and M represents an alkali metal.

In the alkoxide the alkali metal M may be any of Li, Na, K, Rb and Cs. In practice, however, it is suitable to make a selection among lithium, sodium and potassium alkoxides, and it is preferable that the alkyl group R' in the alkoxide has from 1 to 4 carbon atom(s).

As will be understood from the general formula (1), the α-trifluoromethylacrylate monomer may contain fluorine atom(s) in the ester radical too. An example of such cases is 2,2,2-trifluoroethyl α-trifluoromethylacrylate.

The anionic homopolymerization according to the invention is carried out in the manner of solution polymerization. Depending on the combination of an α-trifluoromethylacrylate monomer and an organic solvent, the polymer may or may not dissolve in the solvent. Where the polymer dissolves in the solvent used for the polymerization reaction, the solution after the reaction is poured into a suitable liquid to cause complete precipitation of the polymer. In any case the anionic polymerization reaction must be performed in the absence of water and elemental or molecular oxygen. The polymerization reaction temperature is variable over the range of from about −78° C. to about 100° C. depending on the reaction materials.

In most cases homopolymers of α-trifluoromethylacrylates obtained by the method according to the invention are insoluble in methanol. These polymers are promising as high functional resins useful in various fields including paint materials. resist materials and plastic optical materials.

DESCRIPTION OF THE PREFERRED EMBODIMENTS

α-Trifluoromethylacrylates that can be homopolymerized by the method according to the invention include esters of α-trifluoromethylacrylic acid with an aliphatic alcohol, such as methyl α-trifluoromethyl acrylate, ethyl α-trifluoromethylacrylate, n-propyl α-trifluoromethylacrylate, isopropyl α-trifluoromethylacrylate, n-butyl α-trifluoromethylacrylate, t-butyl α-trifluoromethylacrylate and 2-ethylhexyl α-trifluoromethylacrylate, and esters of α-trifluoromethylacrylic acid with a fluorinated alcohol, such as 2,2,2-trifluoroethyl α-trifluoromethylacrylate, 1H,1H-heptafluorobutyl α-trifluoromethylacrylate, 1H,1H,7H-dodecafluoroheptyl α-trifluoromethylacrylate, 1H,1H-pentadecafluorooctyl α-trifluoromethylacrylate, 1H,1H-pentafluoropropyl α-trifluoromethylacrylate, 1H,1H-heptafluorobutyl α-trifluoromethylacrylate and hexafluoroisopropyl α-trifluoromethylacrylate.

Extremely high purity is not required of α-trifluoromethylacrylate monomers for use in this invention. In general, purity of 98% by gas chromatography is sufficient as far as the monomers are free of such impurities as will be obstructive to anionic polymerization reactions. Sufficient refining of each α-trifluoromethylacrylate monomer can be accomplished by simple distillation or by distillation in a nitrogen or helium gas stream in the presence of a suitable dehydrating agent such as calcium hydride.

The anionic polymerization reaction according to the invention must be carried out in an organic solvent which is practically free of water and elemental or molecular oxygen. It is suitable to use an inactive aprotic solvent which can be selected from aliphatic and aromatic hydrocarbons such as n-hexane, n-heptane, benzene, toluene and xylene and also from some ethers such as ethyl ether, di-n-butyl ether, tetrahydrofuran and dioxane. The selected solvent is dehydrated, degassed and refined by distillation. The quantity of the solvent per unit quantity of the reactant is not strictly limited.

An alkali metal alkoxide is chosen as the anionic polymerization catalyst. Typical examples of useful alkali metal alkoxides are lithium methoxide, sodium methoxide, potassium methoxide, lithium ethoxide, sodium ethoxide, potassium ethoxide, lithium n-propoxide. sodium n-propoxide, potassium n-propoxide, lithium isopropoxide, sodium isopropoxide, potassium isopropoxide, lithium n-butoxide, sodium n-butoxide, potassium n-butoxide, lithium t-butoxide, sodium t-butoxide and potassium t-butoxide. In most cases use of either lithium t-butoxide or potassium t-butoxide is preferable. The amount of the anionic polymerization catalyst is not necessarily limited. However, it is preferable that the catalyst amounts to 0.01–5 mol % of the α-trifluoromethylacrylate monomer.

The reactor to carry out the polymerization reaction may be of any type. For example, either an ampule-like glass reactor or an ordinary solution polymerization reactor provided with a stirrer can be used. It is necessary to dry out the interior of the reactor and to purge oxygen-containing gases from the reactor before charging the reaction materials into the reactor.

The reaction temperature for the polymerization ranges from about −78° C. to about 100° C. In general a very Suitable reaction temperature can be found within the range from −50° C. to 80° C.

After separating the polymer formed by a reaction according to the invention from the mother liquor or from the liquid used for precipitation, the polymer is washed first with dilute hydrochloric acid and then with water, followed by drying.

The invention will further be illustrated by the following nonlimitative examples.

EXAMPLE 1

Ethyl α-trifluoromethylacrylate monomer (b.p. 103°–105° C.) was refined by reflux distillation in the presence of calcium hydride. Together with 50 ml of toluene and 0.08 g (0.001 mol) of lithium t-butoxide, 8.4 g (0.05 mol) of refined ethyl α-trifluoromethylacrylate monomer was put into a glass ampule. After replacing the gas atmosphere in the ampule by nitrogen gas, the ampule was sealed and was left standing at −20° C. for 7 days to allow polymerization of the α-fluoromethylacrylate. The obtained polymer was washed first with dilute hydrochloric acid and then with water, and was dried under vacuum. The yield of the polymer was 100%.

In the infrared absorption spectrum of the obtained polymer, an absorption characteristic of C=O was observed at 1740 cm$^{-1}$ and absorptions characteristic of CF$_3$ at 1290, 1180 and 1100 cm$^{-1}$. $^1$H NMR measurement of the polymer dissolved in deuterated chloroform indicated the following peaks (from TMS): —CH$_2$CH$_3$ 1.3 ppm, —CH$_2$CH$_3$ 4.2 ppm, —CH$_2$ 2.6 ppm.

The polymer was insoluble in methanol, but it was soluble in any of tetrahydrofuran, chloroform and benzene.

EXAMPLE 2

Polymerization of ethyl α-trifluoromethylacrylate was carried out in accordance with Example 1 except that the reaction temperature was raised to 0° C. In this case the yield of the polymer was 61.5%.

Infrared absorption analysis and $^1$H NMR measurement of the polymer gave the same results as in Example 1. Solubilities of this polymer in organic solvents did not differ from the solubilities of the polymer obtained in Example 1.

EXAMPLE 3

Polymerization of ethyl α-trifluoromethylacrylate was carried out in accordance with Example 1 except that 50 ml of tetrahydrofuran was used in place of toluene in Example 1 and that the reaction temperature was raised to 80° C. In this case the yield of the polymer was 58%.

Infrared absorption analysis and $^1$H NMR measurement of the polymer gave the same results as in Example 1. Solubilities of this polymer in organic solvents did not differ from the solubilities of the polymer obtained in Example 1.

EXAMPLE 4

Using the same method and apparatus as in Example 1, 8.4 g (0.05 mol) of ethyl α-trifluoromethylacrylate was mixed with 50 ml of tetrahydrofuran and 0.112 g (0.001 mol) of potassium t-butoxide and was subjected to polymerization at −20° C. for 7 days. In this case the yield of the polymer was 60%.

Infrared absorption analysis and $^1$H NMR measurement of the polymer gave the same results as in Example 1, and the solubilities of the polymer in organic solvents were the same as in the foregoing examples.

EXAMPLE 5

Using the same method and apparatus as in Example 1, 12.3 g (0.05 mol) of 2,2,2-trifluoroethyl α-trifluoromethylacrylate was mixed with 50 ml of toluene and 0.08 g (0.001 mol) of lithium t-butoxide and was subjected to polymerization at −20° C. for 7 days. The yield of the polymer was 83%. This polymer was insoluble in methanol.

EXAMPLE 6

Using the same method and apparatus as in Example 1, 14.5 g (0.05 mol) of hexafluoroisopropyl α-trifluoromethylacrylate was mixed with 50 ml of toluene and 0.08 g (0.001 mol) of lithium t-butoxide and was subjected to polymerization at −20° C. for 7 days. The yield of the polymer was 68%. This polymer was insoluble in methanol.

COMPARATIVE EXAMPLE 1

Together with 50 ml of toluene and 0.18 g (0.001 mol) of phenylmagnesium bromide, 8.4 g of refined ethyl α-trifluoromethylacrylate was put into a glass ampule. After replacing the gas atmosphere in the ampule by nitrogen gas, the ampule was sealed and was left standing at 0° C. for 7 days.

In this case, only 2% of the initial quantity of ethyl α-trifluoromethylacrylate polymerized.

COMPARATIVE EXAMPLE 2

Polymerization of ethyl α-trifluoromethylacrylate was tried by the same method as in Comparative Example 1 except that 0.064 g (0.001 mol) of n-butyllithium was used in place of phenylmagnesium bromide in Comparative Example 1 and that the reaction temperature was lowered to −20° C. As the result, only 3% of the initial quantity of ethyl α-trifluoromethylacrylate polymerized.

COMPARATIVE EXAMPLE 3

Using the same method and apparatus as in Comparative Example 1, 14.5 g (0.05 mol) of hexafluoroisopropyl α-trifluoromethylacrylate was mixed with 50 ml of toluene and 0.079 g (0.001 mol) of pyridine and was subjected to polymerization at 20° C. for 7 days. In this case the yield of the polymer was 56%.

The obtained polymer contained a methanol-soluble fraction, which amounted to 54% of the entire quantity of the polymer.

What is claimed is:

1. A method of preparing a homopolymer of an α-trifluoromethylacrylate represented by the general formula (1), comprising the step of keeping the monomer of said α-trifluoromethylacrylate dissolved in an organic solvent in the presence of an anionic polymerization catalyst which is an alkoxide represented by the general formula (2):

wherein R represents an alkyl group or a fluorine-containing alkyl group:

wherein R' represents an alkyl group and M represents an alkali metal.

2. A method according to claim 1, wherein R' in the general formula (2) represents an alkyl group having not more than 4 carbon atoms, and M in the general formula (2) represents Li, Na or K.

3. A method according to claim 1, wherein said alkoxide is selected from the group consisting of lithium t-butoxide and potassium t-butoxide.

4. A method according to claim 1, wherein said anionic polymerization catalyst amounts to 0.01–5 mol % of said monomer of said α-trifluoromethylacrylate.

5. A method according to claim 1, wherein said α-trifluoromethylacrylate is selected from the group consisting of methyl α-trifluoromethylacrylate, ethyl α-trifluoromethylacrylate, n-propyl α-trifluoromethylacrylate, isopropyl α-trifluoromethylacrylate, n-butyl α-trifluoromethylacrylate, t-butyl α-trifluoromethylacrylate and 2-ethylhexyl α-trifluoromethylacrylate.

6. A method according to claim 1, wherein said α-trifluoromethylacrylate is selected from the group consisting of 2,2,2-trifluoroethyl α-trifluoromethylacrylate, 1H,1H-heptafluorobutyl α-trifluoromethylacrylate, 1H,1H,7H-dodecafluoroheptyl α-trifluoromethylacrylate, 1H,1H-pentadecafluorooctyl α-trifluoromethylacrylate, 1H,1H-pentafluoropropyl α-trifluoromethylacrylate, 1H,1H-heptafluorobutyl α-trifluoromethylacrylate and hexafluoroisopropyl α-trifluoromethylacrylate.

7. A method according to claim 1, wherein said organic solvent is an aprotic solvent.

8. A method according to claim 7, wherein said organic solvent is selected from the group consisting of n-hexane, n-heptane, benzene, toluene, xylene, ethyl ether, di-n-butyl ether, tetrahydrofuran and dioxane.

9. A method according to claim 1, wherein the reaction system comprised of said monomer, said organic solvent and said anionic polymerization catalyst is kept at a temperature in the range from about −78° C. to about 100° C.

10. A method according to claim 9, wherein said temperature is in the range from −50° C. to 80° C.

* * * * *